US006868442B1

(12) United States Patent
Burdeau

(10) Patent No.: US 6,868,442 B1
(45) Date of Patent: Mar. 15, 2005

(54) METHODS AND APPARATUS FOR PROCESSING ADMINISTRATIVE REQUESTS OF A DISTRIBUTED NETWORK APPLICATION EXECUTING IN A CLUSTERED COMPUTING ENVIRONMENT

(75) Inventor: Stephen A. Burdeau, Phoenixville, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/127,167

(22) Filed: Jul. 29, 1998

(51) Int. Cl.[7] ............................................. G06F 15/173
(52) U.S. Cl. ....................... 709/223; 709/243; 709/244; 719/310
(58) Field of Search .......................... 719/310; 709/223, 709/243, 244, 238

(56) References Cited

U.S. PATENT DOCUMENTS

| 5,287,453 A | * | 2/1994 | Roberts ....................... 709/201 |
|---|---|---|---|
| 5,572,711 A | | 11/1996 | Hirsch et al. ................ 395/500 |
| 5,619,655 A | | 4/1997 | Weng et al. ........... 394/200.11 |
| 5,671,414 A | * | 9/1997 | Nicolet ........................ 709/328 |
| 5,694,595 A | | 12/1997 | Jacobs et al. ................ 395/609 |
| 5,696,895 A | | 12/1997 | Hemphill et al. ...... 395/182.02 |
| 5,734,831 A | | 3/1998 | Sanders .................. 395/200.53 |
| 5,745,692 A | | 4/1998 | Lohmann, II et al. .. 395/200.53 |
| 5,748,896 A | | 5/1998 | Daly et al. ............. 395/200.53 |
| 5,751,962 A | * | 5/1998 | Fanshier et al. ............ 709/223 |
| 5,926,636 A | * | 7/1999 | Lam ............................ 709/313 |
| 5,933,601 A | * | 8/1999 | Fanshier et al. ............ 709/223 |
| 6,275,867 B1 | * | 8/2001 | Bendert et al. ............. 709/316 |
| 2001/0052024 A1 | * | 12/2001 | Devarakonda ............... 709/238 |

FOREIGN PATENT DOCUMENTS

EP          0 841 626 A         5/1998

OTHER PUBLICATIONS

"TOP END on Windows NT—The Continuing Evolution of Open Systems," Feb. 1997.*
Ghormley, D.P., et al., "Glunix: A Global Layer Unix For A Network Of Workstations,"Software Practice & Experience, GB, John Wiley & Sons Ltd. Chichester, vol. 28, No. 9, p. 929–961.

* cited by examiner

Primary Examiner—Meng-Al T. An
Assistant Examiner—Li Zhen
(74) Attorney, Agent, or Firm—Lise A. Rode; Mark T. Starr

(57) ABSTRACT

Administrative requests of a distributed network application executing in a clustered computing environment comprising a plurality of nodes, wherein the application requires centralized administration via a master node, are routed from the nodes at which the requests originate to the node that is acting as the master for the distributed network application.

10 Claims, 7 Drawing Sheets

METHODS AND APPARATUS FOR PROCESSING ADMINISTRATIVE REQUESTS OF A DISTRIBUTED NETWORK APPLICATION EXECUTING IN A CLUSTERED COMPUTING ENVIRONMENT

COPYRIGHT NOTICE

A portion of the disclosure of this patent document contains material that is subject to copyright protection. The copyright owner has no objection to the facsimile reproduction by anyone of the patent document or the patent disclosure as it appears in the United States Patent & Trademark Office patent file or records, but otherwise reserves all copyright rights whatsoever.

BACKGROUND

1. Field of the Invention

The present invention is directed to distributed network applications in a clustered computing environment, and more particularly, to methods and apparatus for processing administrative requests of the distributed application in such an environment.

2. Description of the Prior Art

Distributed network applications often have the concept of a master machine that performs administration for the entire distributed application. In this case, administration includes bringing a component online, taking a component offline, or checking the status of an individual component. Software architectures that permit multiple computers to operate together in a cluster to improve overall availability, such as the architecture of Microsoft® Cluster Server (MSCS), do not fit the centralized administration model of such distributed network applications. With MSCS, for example, a custom resource DLL on each node of a cluster must implement administrative operations for that node, such as bringing a component online, taking a component offline, or checking the status of a component. Thus, when an administrative operation (e.g. offline, online, etc.) is to be performed on a given node, MSCS invokes the resource DLL on that node to perform the operation. This is contrary to the centralized administration model of many distributed network applications which requires that all such operations be initiated and controlled by a single, master node in the cluster—i.e. if a node is to be brought online or offline, for example, that operation would be initiated and performed by the master node for the distributed application. As a more specific example, this problem arises, for example, when a distributed application written for BEA Systems, Inc.'s Tuxedo® transaction manager and messaging middleware is executed in a clustered computing environment under the control of Microsoft's Cluster Server (MSCS) software.

A. Tuxedo

In a Tuxedo environment, one or more Logical Machines can be grouped together to define a Tuxedo Domain. A Logical Machine represents a Tuxedo server machine and often corresponds to a physical computer system (i.e., one node of a network), but this is not always the case—in some cases, more than one Logical Machine can be defined on a single node.

Each Logical Machine contains Tuxedo Admin Servers, including a BBL process, a Bridge process, and possibly a DBBL process. Each Logical Machine also has a Tuxedo TListen process. The BBL process monitors and controls user-written Servers. The Bridge process on one Logical Machine connects to the TListen process on another Logical Machine. One of the Logical Machines in the Domain is designated as the Master; the Master may also have a Backup configured. The DBBL is run on the Logical Machine which is acting as the Master. The DBBL coordinates and controls the various BBLs, i.e., it performs administration for the Domain, including bringing a component online, taking a component offline, or checking the status of an individual component.

The user-written Servers on a Logical Machine are grouped into one or more Tuxedo Server Groups. If the Tuxedo Server Group supports transactions, transaction states are logged to a TLOG. Each Logical Machine has its own distinct TLOG. Other state and configuration information is stored in a binary TUXCONFIG file. Each Logical Machine has its own copy of the TUXCONFIG, but the DBBL keeps the various TUXCONFIG files synchronized.

B. Microsoft Cluster Server (MSCS)

In the current release of Microsoft® (Windows NT®, Enterprise Edition, a cluster refers to two connected systems (usually called nodes) that act as a highly available system. These two systems have one or more physical disk drives on a shared SCSI bus; each disk on the shared SCSI bus may be accessed by either system, but only by one system at a time. If one of the systems in the cluster fails, the other system gains control of the shared disk(s) and continues to provide service, picking up where the failed system left off. Future releases of Windows NT are expected to support clusters with more than two nodes.

MSCS is controlled by the Cluster Service which runs on each node of the cluster. The Cluster Service spawns one or more Resource Monitors. A Resource Monitor watches over one or more resources. A resource is any entity which can be monitored and controlled by MSCS. The Resource Monitor calls entry points in a Resource DLL (as defined in the MSCS Resource API) to monitor and control a particular resource. In particular, a Resource Monitor calls entry points in the Resource DLL at appropriate times to check the state of the resource, bring the resource online, or take the resource offline. Note, therefore, that the Resource DLL implements the action needed to bring the resource online or take the resource offline—administrative operations that in a Tuxedo environment must be performed by the Tuxedo master. Moving a resource from one node to the other occurs by taking the resource offline on the first node and bringing the resource online on the second node.

MSCS includes a Resource DLL (clusres.dll) that defines several resource types. Below is a list of relevant resource types supported by clusres.dll:

Physical Disk—controls a physical disk drive located on the shared SCSI bus.

IP Address—defines an IP address which can be dynamically allocated to one node or the other.

Network Name—defines a symbolic name for an IP address resource.

Generic Service—controls any Windows NT service.

Generic Application—controls well-behaved Windows NT console application programs.

In addition, third party developers can create custom resource types by developing and registering a Resource DLL that conforms to the Resource API.

MSCS resources can be grouped together into a Resource Group. A Resource Group is the basic unit of failover; that is, every resource in a particular group runs on the same node at a given point in time. The resources within a Resource Group can have dependencies that control the relative order of online and offline operations.

Typically, a Resource Group will contain one or more Physical Disk resources, an IP Address resource, a Network Name resource, and one or more additional resources representing a server application, such as Generic Service resources, Generic Application resources, and/or custom resource types. A Resource Group that has its own IP Address resource and Network Name resource is known as a Virtual Server.

A Virtual Server appears to an external client running a TCP/IP client/server type application as a distinctive server computer. In reality, there may be several Virtual Servers running on a single node of an MSCS cluster, each with different IP addresses. Furthermore, the Virtual Server can move from one node of the MSCS cluster to the other, and this is transparent to the client (except for a momentary interruption or slow down in service).

FIG. 1 illustrates an exemplary cluster comprising two nodes 10, 12 each running a respective virtual server 14, 16. A Cluster Service 18 running on each node controls the cluster, including, for example, initiating administrative requests to the Resource Monitors (not shown) of each virtual server 14, 16. Each node 10, 12 is connected to a plurality of disks 20 via a shared bus 24, such as, for example, a SCSI bus. Each node 10, 12 is also connected via a respective network interface to a local area network (LAN) 22.

Referring now to FIG. 2, if the second node 12 of the cluster fails, MSCS starts the failed Virtual Server 16 on the first node 10 of the cluster. This is a failover. At this point, both Virtual Servers 14, 16 are running on the first node. Client programs continue to run normally (with the exception of possibly degraded performance).

When the second node 12 of the cluster resumes normal operation, MSCS takes the failed-over Virtual Server 16 offline on the first node 10. Then MSCS brings this Virtual Server 16 back online on the second node 12. This is a failback. At this point, the configuration shown in FIG. 1 has resumed, in which each node is running one Virtual Server.

C. Deploying a Distributed Network Application in a Clustered Environment

A distributed network application, such as an application designed to run in the Tuxedo environment, can be set-up to run in a clustered computing environment, such as MSCS. For example, referring to FIG. 1, a Tuxedo Domain with two Logical Machines could be configured with the two MSCS Virtual Servers 14, 16. During normal operations, one Virtual Server (and therefore one Logical Machine) runs on each of the nodes 10, 12 of the cluster. As the foregoing illustrates, however, a problem arises in that administrative requests are handled differently in the Tuxedo and MSCS environments. In the Tuxedo architecture, administrative requests, including bringing a component online or offline, are performed by a designated master node. On the contrary, in the MSCS environment, administrative requests are performed by the resource DLL on the node to which the operation is directed, not by a designated master node. The present invention provides a solution to this problem.

SUMMARY OF THE INVENTION

The present invention is directed to methods and apparatus for enabling a distributed network application that requires centralized administration via a master node (e.g., Tuxedo-based applications) to be deployed in a clustered environment that does not support such centralized administration (e.g., MSCS), so that the application can take advantage of the increased availability achieved through clustering. More particularly, the methods and apparatus of the present invention route administrative requests (e.g. online, offline, etc.) of a distributed network application executing in a clustered computing environment, from the node where the requests originate to the node that is acting as the master for the distributed network application in that cluster. For example, in one specific embodiment, the invention routes Tuxedo-based administrative requests from an MSCS resource DLL to the master machine of a Tuxedo application executing in an MSCS-controlled cluster.

In a preferred embodiment, routing of administrative requests is achieved by a plurality of server programs, hereinafter referred to as Pipe Servers, that are installed on each node of the cluster. The Pipe Server at a given node creates instances of a named pipe through which client programs, including Pipe Servers on other nodes, can pass messages comprising administrative requests to the node. The Pipe Server forwards received messages to an administrative API of the distributed network application.

Additional features and advantages of the present invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENT

I. Overview

The present invention is directed to methods and apparatus for enabling a distributed network application that requires centralized administration via a master node to be deployed in a clustered environment that does not support such centralized administration, so that the application can take advantage of the increased availability achieved through clustering. More particularly, the methods and apparatus of the present invention route administrative requests (e.g., online, offline, etc.) of a distributed network application executing in a clustered computing environment, from the node where the requests originate to the node that is acting as the master for the distributed network application in that cluster. The present invention may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

According to the present invention, administrative requests of a distributed network application executing in a clustered computing environment comprising a plurality of nodes, wherein the application requires centralized administration via a master node, are routed from the nodes at which the requests originate to the node that is acting as the master for the distributed network application. Replies that indicate the success or failure of a request are then sent from the master node back to the node from which the request originated. Routing of administrative requests is achieved by a plurality of server programs, hereinafter referred to as Pipe Servers, that are installed on each node of the cluster. The Pipe Server at a given node creates instances of a named pipe through which client programs, including Pipe Servers on other nodes, can pass messages comprising administrative requests to the node. The Pipe Server forwards received messages to an administrative API of the distributed network application.

Figure 1:
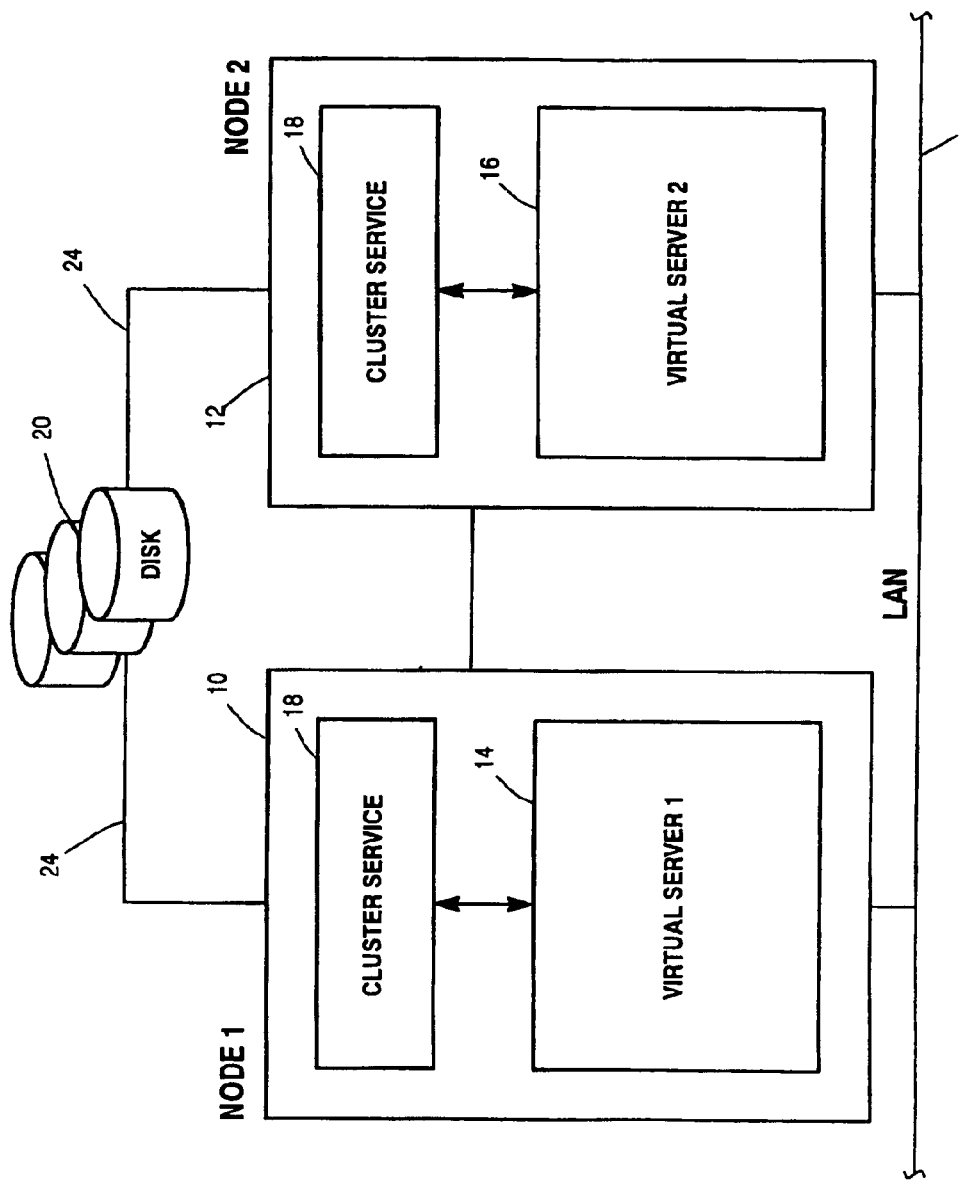
FIG. 1 is a block diagram illustrating the operation of a prior art computer cluster comprising two nodes.
Figure 2:
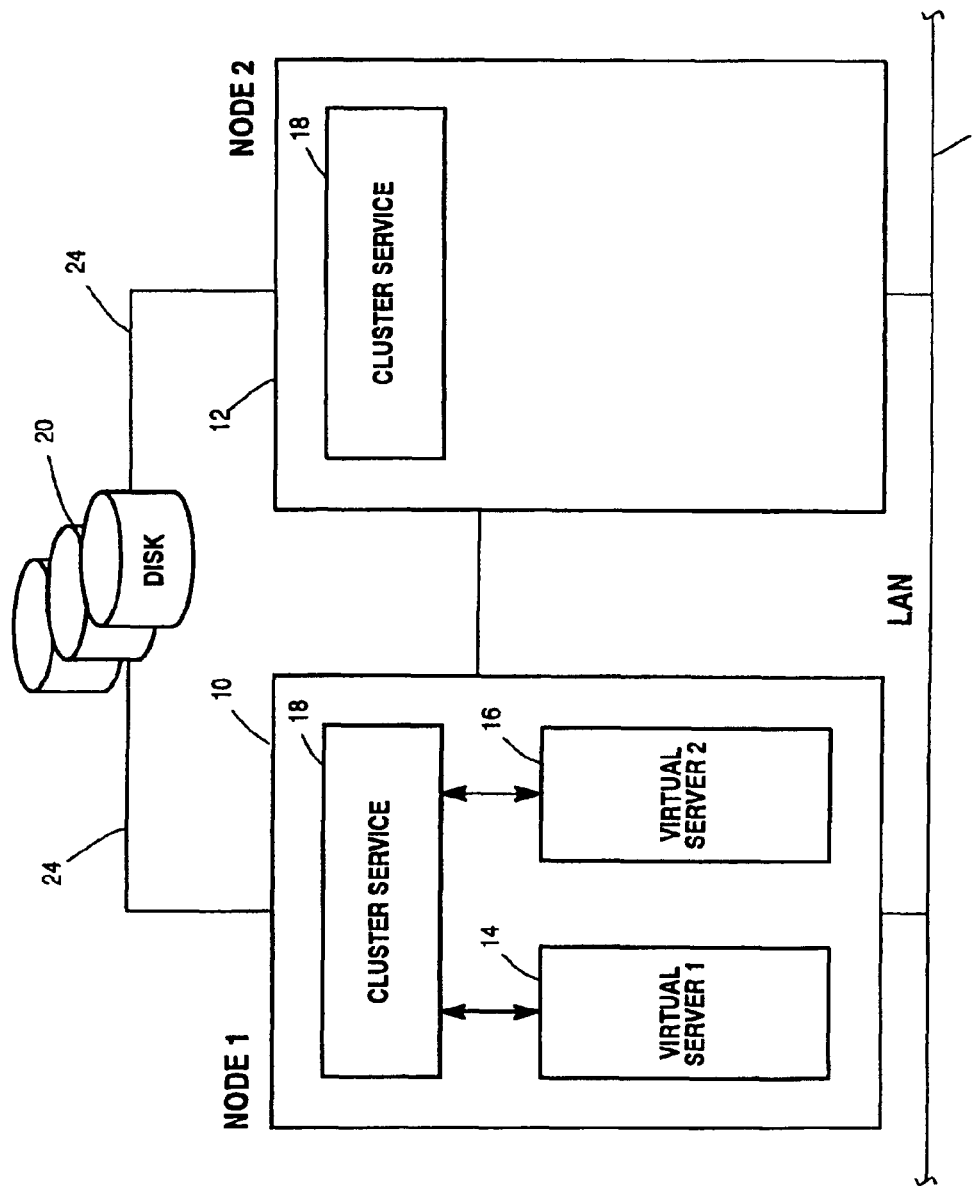
FIG. 2 is a block diagram illustrating a failover mode of operation of the cluster of FIG. 1.
Figure 3A:
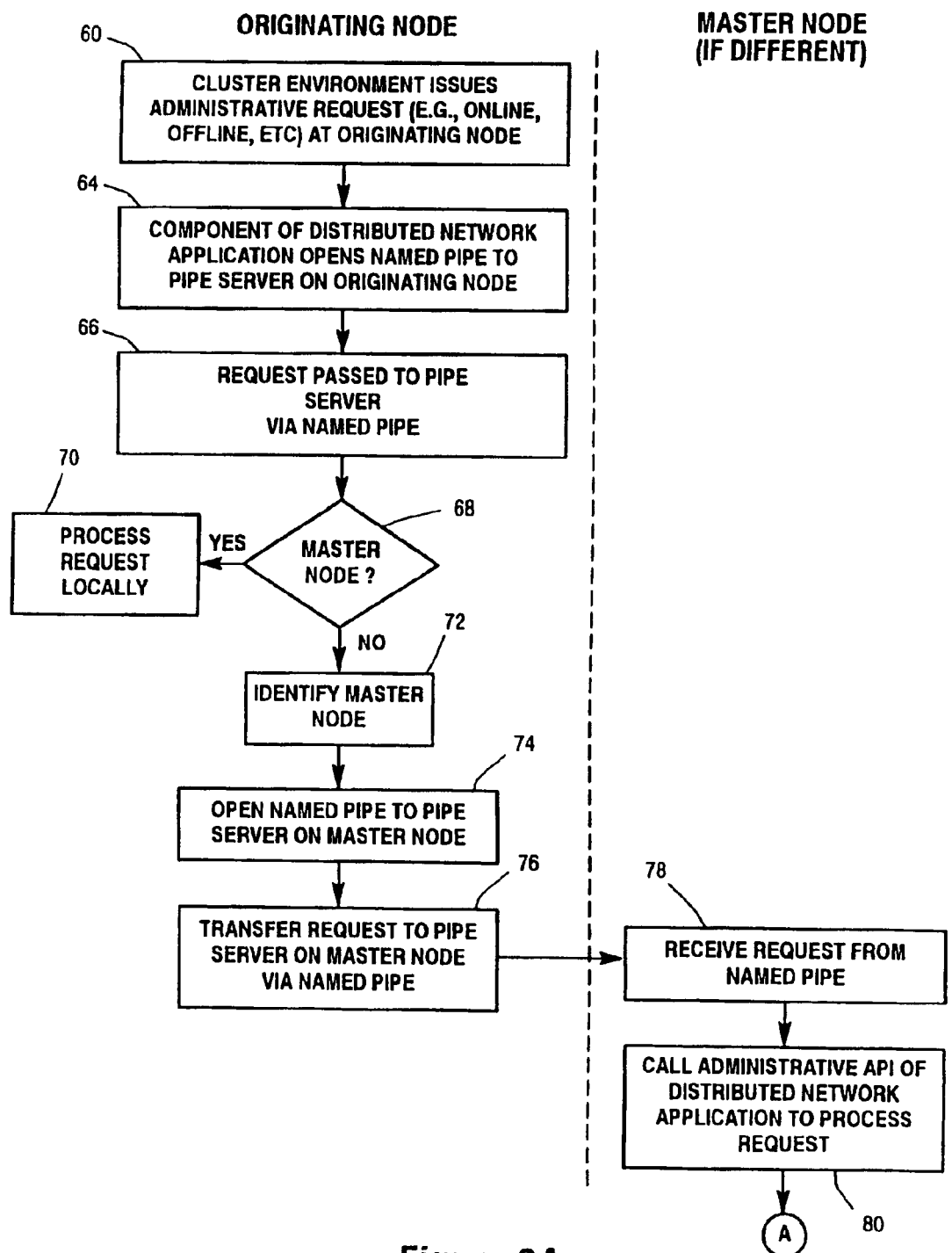
FIGS. 3A and 3B comprise a flow diagram illustrating a preferred embodiment of the method of the present invention.
Figure 3B:
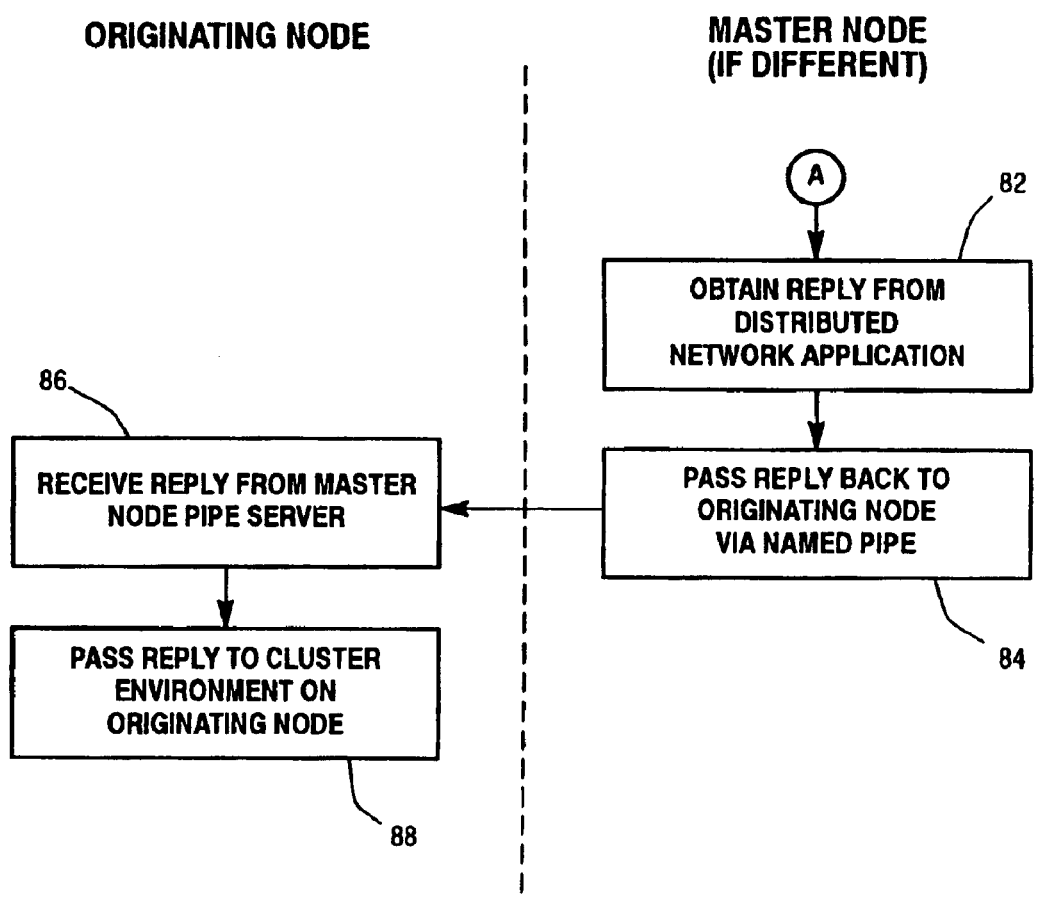

FIGS. 3A and 3B comprise a flow diagram illustrating a preferred embodiment of the method of the present invention. As shown, at step 60, the clustered environment issues an administrative request (e.g., a request to bring a component of a distributed network application online, or to take it offline) at an originating node. Next, at step 64, the component of the distributed network application opens a named pipe to a Pipe Server executing on the originating node, and passes the request message to the Pipe Server via the named pipe at step 66.

At step 68, the Pipe Server on the originating node determines whether the originating node is designated as a master node for the distributed network application. If so, then at step 70, the request is processed locally.

If at step 68 it is determined that the originating node is not the designated master node, then at step 72 the Pipe Server determines the identity of the master node. Then, at step 74, the Pipe Server on the originating node opens a named pipe to the Pipe Server on the designated master node. At step 76, the request message is forwarded to the Pipe Server on the master node via the named pipe.

At step 78, the Pipe Server on the master node receives the message via the named pipe connection thereto. At step 80, the Pipe Server on the master node calls the administrative API of the distributed network application to initiate processing of the request contained in the message. At step 82 (FIG. 3B), the Pipe Server on the master node obtains the result (e.g., success or failure) of the request processing from the distributed network application and, at step 84, passes the reply back to the Pipe Server of the originating node via the same named pipe. At step 88, the Pipe Server on the originating node forwards the reply to the cluster environment on the originating node to complete processing.

II. Exemplary Application

Figure 4:
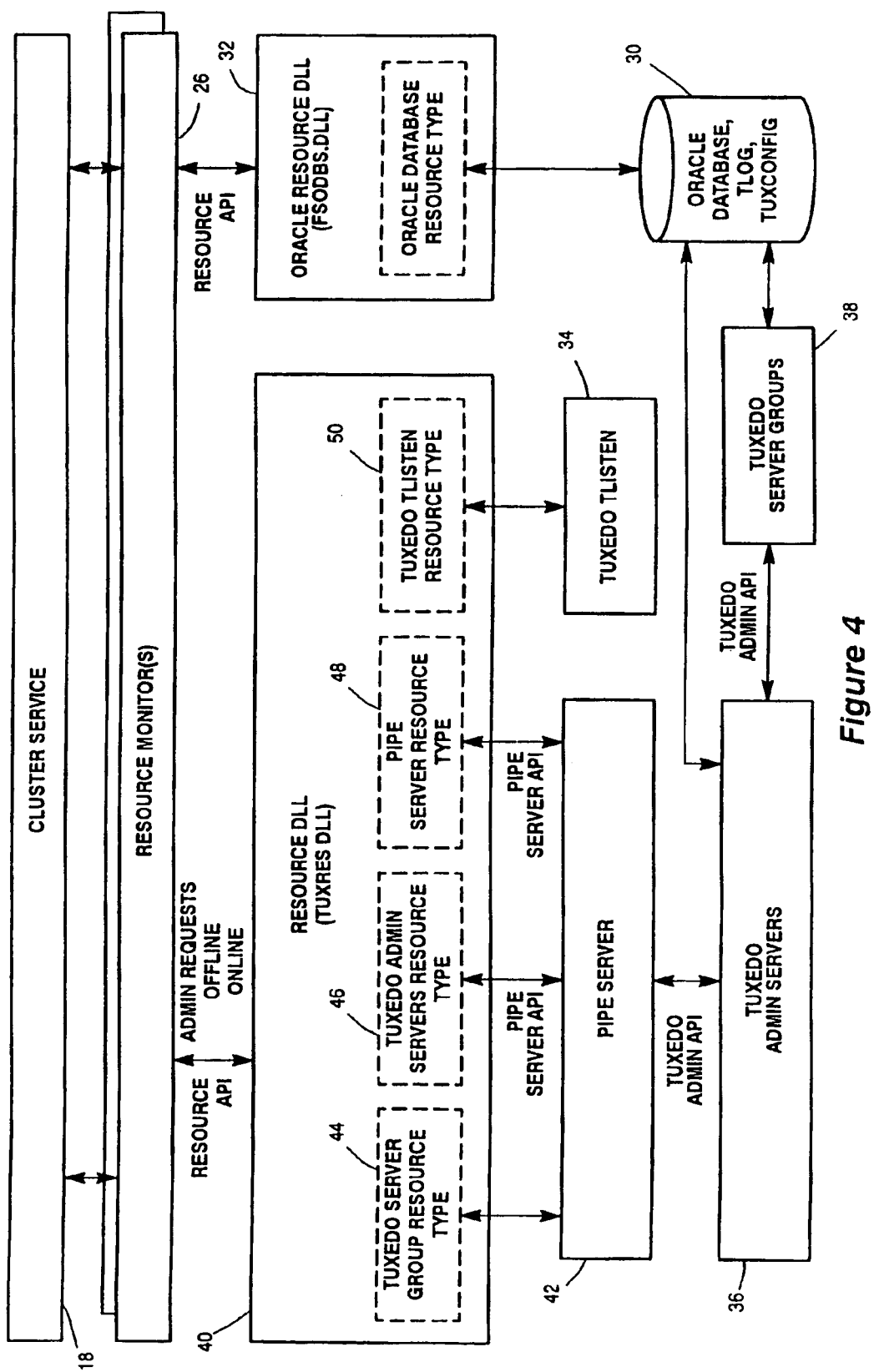
FIG. 4 is a block diagram illustrating both a preferred embodiment of apparatus for carrying out the method of the present invention and an exemplary application of the present invention in an environment comprising a distributed network application written for the Tuxedo environment and deployed in a clustered computing environment controlled by MSCS.

FIG. 4 is a block diagram illustrating both a preferred embodiment of apparatus for carrying out the method of the present invention and an exemplary application of the present invention in an environment comprising a distributed network application written for the Tuxedo environment (which requires centralized administration via a master node) deployed in a clustered computing environment controlled by MSCS (which does not support centralized administration) and comprising a plurality of nodes. As described hereinafter in greater detail, administrative requests of the Tuxedo application are routed from the resource DLLs of the nodes at which the requests originate to the node that is acting as the master for the Tuxedo application. It is understood, however, that the present invention is not limited to use with Tuxedo-based applications and/or MSCS-controlled computer clusters, but rather may be employed in any system in which a distributed network application requires centralized administration via a master node, but wherein the clustered environment in which the application is deployed does not support such centralized administration.

In accordance with the embodiment described hereinafter, each Logical Machine of a Tuxedo-based distributed network application is mapped to a respective MSCS Virtual Server. In this example, each Logical Machine controls an Oracle® database. By way of additional background, a free add-on product included with the database software available from Oracle Corporation—Oracle® FailSafe— provides a Resource DLL that defines a custom resource type called Oracle Database. Oracle Corporation also provides an administrative tool called Oracle FailSafe Manager to create and manage Oracle resources for an MSCS environment.

FIG. 4 illustrates the functional components of each Virtual Server/Logical Machine of the exemplary configuration. As shown, for each Logical Machine, an MSCS Resource Group is created, containing the following resources:

Physical Disk(s) 30—one or more physical disks 30 on a shared SCSI bus (not shown) —these disk(s) contain the TLOG, TUXCONFIG, and Oracle database(s) used by the Tuxedo Logical Machine;

Oracle Resource(s) 32—the resources created by the Oracle FailSafe Manager for the Oracle database(s) used by the Tuxedo Logical Machine;

Tuxedo TListen 34;

Tuxedo Admin Servers 36; and

Tuxedo Server Group(s) 38—there is one Tuxedo Server Group resource instance for each Server Group configured for this Logical Machine in the GROUPS section of the Tuxedo configuration.

The Resource Group for each logical machine has an IP Address on the local area network (not shown), and a Network Name that matches the machine name used in the MACHINES section of the Tuxedo configuration and the NLSADDR and NADDR values specified for the in the NETWORK section. According with the present invention, each Resource Group further comprises a Resource DLL 40 and a Pipe Server 42, which together provide apparatus for carrying out the method of the present invention. As described hereinafter, the Resource DLL 40 represents a component of the Tuxedo distributed network application that provides an interface between the cluster environment and other components of the Tuxedo application on that node.

With this configuration, a Tuxedo Domain with, for example, two Logical Machines, is configured with two MSCS Virtual Servers. During normal operations, one Virtual Server (and therefore one Logical Machine) runs on each of the nodes of the cluster. If the first node of the cluster fails, MSCS starts the failed Virtual Server (and corresponding Logical Machine) on the second node of the cluster—a failover situation. Both Virtual Servers (and both Logical Machines) then run on the second node. Tuxedo client programs continue to run normally (with the exception of possibly degraded performance). When the first node of the cluster resumes normal operation, MSCS takes the failed-over Virtual Server (and corresponding Logical Machine) offline on the second node. Then MSCS brings this Virtual Server (and corresponding Logical Machine) online on the first node. This is the failback situation. After a failback, each node again runs one Virtual Server (and therefore one Logical Machine). As described hereinafter, the method of the present invention enables the administrative requests associated with this and other scenarios to be routed from the originating node to the node that is acting as the master for the Tuxedo Domain.

A. The Resource DLL 40

The Resource DLL 40 supports the following resource types: Tuxedo Server Group; Tuxedo Admin Servers; Pipe Server; and Tuxedo TListen. Each resource type is supported by a respective set of entry point functions 44, 46, 48, and 50, in the Resource DLL 40. The Tuxedo Server Group resource type 44 is used to monitor and control the operation of Tuxedo Server Groups 38. The Tuxedo Admin Servers resource type is used to monitor and control the operation of Tuxedo Admin Servers 36. The Pipe Server resource type is used to monitor and control the operation of a Pipe Server process 42. The Tuxedo TListen resource type is used to monitor and control the operation of a Tuxedo TListen process 34.

The Resource DLL conforms to the specifications of the Microsoft Resource API, which specifies the entry point functions that must be implemented for each resource type (e.g., resource types 44, 46, 48, and 50) supported by a Resource DLL. A Resource Monitor 26 calls these entry point functions to perform a given function on a particular resource. The Resource API also specifies callback functions that are implemented by the Resource Monitor 26 and are called from the Resource DLL. Of the entry point functions that must be implemented by a Resource DLL, two are examples of the types of administrative requests that a distributed network application, such as a Tuxedo application, may require to be performed centrally by a master node: (1) Online; and (2) Offline. There is one Online function and one Offline function for each resource type. The purpose of Online is to bring a particular instance of a resource online, and the purpose of Offline is to take the particular instance of the resource offline. Of particular relevance to the present invention are the Online and Offline functions for the Tuxedo Admin Servers Resource Type 46. These functions have corresponding functions in the Tuxedo Admin API that must be performed by the designated master of a Tuxedo application. Thus, while the Resource API of the MSCS environment requires that a Resource DLL provide entry point functions for handling Online and Offline requests at the node at which the request originates, the Tuxedo Admin API requires that such requests be performed centrally by the designated master node. This represents one particular example of the problem for which the present invention provides a solution.

According to the present invention, the Resource DLL 40 does not interface directly with the Tuxedo Admin API to control Tuxedo resources. Instead, the Resource DLL uses a Pipe Server API (described hereinafter) to send requests to the Pipe Server 42. The Pipe Server 42, in turn, uses the Tuxedo Admin API to monitor and control Tuxedo resources. Thus, in a clustered computing environment that comprises a plurality of nodes but that does not support centralized administration, the Pipe Server 42 provides a means for routing administrative requests of a distributed network application from a node at which a request originates to a node that is designated as the master for that application.

The reason why the Resource DLL 40 does not interface directly with the Tuxedo Admin API on the same node, but instead interfaces with the Pipe Server 42 on that node, is because the Resource DLL 40 cannot act as a native client, whereas the Pipe Server 42 can. A client program that performs Tuxedo Admin API calls must be a native Tuxedo client. A native client is a client that runs on one of the machines identified in the MACHINES section of the Tuxedo configuration. The Resource DLL 40 runs under the process of a Resource Monitor (e.g., Resource Monitor 26), and its computer name (as returned by the WIN32 API function GetComputerName) matches the name of the cluster node on which it is running. The Tuxedo configuration, however, uses the Network Name of the corresponding Virtual Server as the machine name. Therefore, the Resource DLL cannot act as a native client. On the contrary, the Pipe Server 42 runs with an MSCS feature that causes the Network Name (instead of the cluster node name) to be returned when GetComputerName is called. Therefore, the Pipe Server 42 can act as a native client.

B. The Pipe Server 42

According to the preferred embodiment of the present invention, a named pipe facility is used to pass messages between a client process (e.g., the Resource DLL 40) and the Pipe Server 42, and/or between the Pipe Servers 42 on two different nodes. Thus, a named pipe can be used to provide two-way communication between processes on the same computer or between processes on different computers across a network. In the present embodiment, the named pipe facility of the Microsoft Windows NT operating system is employed.

The Pipe Server 42 provides an Application Programming Interface (API) for passing messages comprising administrative requests between processes via a named pipe. The Pipe Server API specifies the format of messages to be exchanged and methods for performing the exchange.

1. Pipe Server API—Message Types

A message comprises a 32-bit request code, followed by the contents of the particular request message. The request code identifies the type of request. For handling Online and Offline requests, the Pipe Server API defines the following request codes:

| | |
|---|---|
| #define PIPE_REQ_MIB | 1 |
| #define PIPE_REQ_ADM_ONLINE | 2 |
| #define PIPE_REQ_ADM_OFFLINE | 3 |

PIPE_REQ_MIB is a message type that represents a generic form of Tuxedo Admin request that accesses Management Information Bases (MIBs). MIBs are accessed in order to perform Tuxedo programmed administration. It the request code is PIPE_REQ_MIB, the request code word is immediately followed by a Tuxedo FML32 buffer. FML32 is a type of fielded buffer. Fielded buffers contain attribute-value pairs called fields. The attribute is the field's identifier, and the associated value represents the field's data content. All of the data associated with a fielded buffer is self-contained (i.e., there are no pointers to data outside the fielded buffer). This means that fielded buffers can be transmitted between distinct processes, even between processes running on different computers. Tuxedo provides the function libraries needed to allocate, build, add data to, and extract data from FML32 buffers. The Tuxedo Admin API defines the specific format of the FML32 request buffers needed to perform MIB access requests. In the present embodiment, the PIPE_REQ_MIB request type supports any valid MIB Access request with a TA_OPERATION of "GET" or "SET". The "GETNEXT" operation is not supported in the present embodiment, although it could be in other embodiments.

For all request codes other than PIPE_REQ_MIB, such as PIPE_REQ_ADM_ONLINE and PIPE_REQ_ADM_OFFLINE, the request message comprises a data structure that includes the request code and any other information relevant to the particular type of request identified by the request code. For example, the following C language type definition may be employed:

```
typedef struct _pipe_request_t {
    DWORD   requestCode;
    DWORD   packetRevision;
    DWORD   cmdInputSize;
    BOOL    returnCmdOutput;
    char    cmd[MAX_TUX_CMD_LEN+1];
    char    opts[MAX_TUX_OPTS_LEN+1];
    char    groupName[MAX_GROUPNAME_LEN+1];
} PIPEREQ;
typedef PIPEREQ         *LPPIPEREQ;
typedef const PIPEREQ   *LPCPIPEREQ;
```

The requestCode field contains the particular request code identifying the type of request message being sent. In the present embodiment, the packetRevision field is reserved for future use and is simply set to zero. The remaining fields are related to other functionality of the Pipe Server 42 that is not part of the present invention.

A request code of PIPE_REQ_ADM_ONLINE represents a request to bring the Tuxedo Admin Servers (corresponding to the Virtual Server on which the Pipe Server is running) online for MSCS purposes. In this case, all other fields in the request structure are set to zero. A request code of PIPE_REQ_ADM_OFFLINE represents a request to take the Tuxedo Admin Servers (corresponding to the Virtual Server on which the Pipe Server is running) offline for MSCS purposes. Again, in this case, all other fields in the request structure are set to zero.

The Pipe Server API also specifies the format of reply messages that are used to indicate the results of a particular request. If the request code was PIPE_REQ_MIB, the reply message is a Tuxedo FML32 buffer. The Tuxedo Admin API defines the specific format of the FML32 reply buffers returned when performing MIB access requests. For all request codes other than PIPE_REQ_MIB, the reply message format may be defined by the following C type definitions:

```
typedef struct _pipe_reply_t {
    DWORD   packetRevision;
    DWORD   cmdOutputSize;
    Int     status;             // See
```

```
                            -continued define PIPE_REP_GOOD_STATUS            C   // statuses
define PIPE_REP_ERROR_STATUS          -1   // below:
#define PIPE_REP_MASTER_UNAVAILABLE    -2   // Success
                                            // General
                                            // error
                                            // Tuxedo
                                            // Master
                                            // was
                                            // un-
                                            // available,
                                            // so unable
                                            // to
                                            // accurately
                                            // determine
                                            // looks
                                            // alive
                                            // status.
#define PIPE_REP_NO_RESPONSE           -3   // No
                                            // reply was
                                            // received
                                            // due to a
                                            // broken
                                            // pipe,
                                            // timeout, etc.
} PIPEREP;
typedef PIPEREP         *LPPIPEREP;
typedef const PIPEREP   *LPCPIPEREP;
```

The packet Revision field is reserved for possible future use, and in the present embodiment, is always set to zero. The cmdOutputSize field relates to a feature of the Pipe Server 42 that is not part of the present invention. The status field holds a value indicative of the outcome of the request. The status field is set to PIPE_REP_NO_RESPONSE if no reply is returned from the pipe server due to a broken pipe error or a timeout. For PIPE_REQ_ADM_ONLINE requests, the status field is set to PIPE_REP_GOOD_STATUS if the Tuxedo Admin Servers were brought online successfully, or PIPE_REP_ERROR_STATUS for a failure. For PIPE_REQ_ADM_OFFLINE requests, the status field is set to PIPE_REP_GOOD_STATUS if the Tuxedo Admin Servers were taken offline successfully, or PIPE_REP_ERROR_STATUS for a failure. PIPE_REP_MASTER_UNAVAILABLE is status code that is used in connection with features that are not part of the present invention.

2. Pipe Server API—Access Functions

As mentioned above, in the present embodiment, a Windows NT named pipe is used to pass messages between a client process (e.g., the Resource DLL 40) and the Pipe Server 42, or between two Pipe Servers 42 on different nodes. To request service from a Pipe Server 42 on a given node, a client process, such as the Resource DLL 40, or a Pipe Server 42 on another node, performs the steps shown in Listing 1:

(a) Call WIN32 CreateFile function to open the named pipe for both read and write;

(b) Call WIN32 SetNamedPipeHandleState function to set the named pipe to message mode (as opposed to byte stream mode);

(c) Call WIN32 WriteFile function to send the request buffer to the server;

(d) Call WIN32 ReadFile function to read the reply buffer from the server; and (e) Call the WIN32 CloseHandle function to close the named pipe.

Listing 1.

Windows NT Overlapped I/O may be used for steps (c) and (d) of Listing 1 to allow for interruption.

The name of the named pipe used by a client on a given node to pass messages to the Pipe Server 42 on that same node or a different node (client-side name) is of the form:

\\serverComputerName
\pipe\TUXPIPESERVER.serverComputerName, where serverComputerName is the name of the computer (as returned by WIN32 GetComputerName function) on which the Pipe Server is running. In an MSCS environment, this is the Network Name value of the MSCS Virtual Server on which the Pipe Server 42 is running.

The name of a named pipe used by the Pipe Server 42 when creating the named pipe instance (server-side name) is of the form:

\\.\pipe\TUXPIPESERVER.serverComputerName.

Note that the use of the period (.) instead of the computer name at the beginning of the name is required when a server creates a named pipe. Therefore, the serverComputerName portion of the named pipe name is specified in the last part of the named pipe name to handle the case where more than one Virtual Server is running on the same physical computer.

The Pipe Server 42 creates the named pipe using default security. The Pipe Server 42 runs under the Windows NT domain account used to start the MSCS service. This means that only clients using this same account (or an account with administrator privilege for the server system) have the access rights needed to open the named pipe. All other clients will get an ERROR_ACCESS_DENIED error code (5) returned when opening the client side of the pipe with the CreateFile function.

In order to simplify the client side processing, access functions are provided that encapsulate the functionality described in steps (a) through (e) above. Each of the functions has an IntrPtr parameter. Since sending a request to the Pipe Server 42 and awaiting a response can be a time consuming activity, the IntrPtr parameter is used to control interrupting the operation. If IntrPtr is NULL, the requested operation is not interruptible. If IntrPtr is not NULL, it points to a structure defined as follows:

```
// The structure type INTR is used to control interrupting long running
// operations.
typedef struct _interrupt_t {
    LPVOID  workerPtr;
        // workerPtr is the pointer for this worker thread, which is
        // required by the ClusWorkerCheckTerminate function,
        // or NULL is ClusWorkerCheckTerminate should not
        // be called.
    time_t stopTime;
        // stopTime is the time (as returned by the "time"
        // function) when this operation should be interrupted,
        // or 0 if there is no time limit.
} INTR;
typedef INTR    *LPINTR;
```

If the workerPtr field is not NULL, this is the pointer to the Worker structure which is used when creating a worker thread with the Cluster Utility function ClusWorkerCreate. The Cluster Utility functions are provided as part of MSCS. The use of worker threads is described more fully hereinafter. When workerPtr is not NULL, the access functions periodically call the Cluster Utility function ClusWorkerCheckTerminate to determine if the worker thread has been requested to terminate. If ClusWorkerCheckTerminate returns TRUE, the access functions abort the operation in progress and return an error.

If the stopTime field is not zero, then it represents the deadline time for this operation, in the same form returned by the C run-time time function (i.e., number of seconds since 1970). When stopTime is non-zero, the access functions periodically check to see if the deadline time has arrived. If so, the access functions abort the operation and return an error.

Each of the functions has a numRetries parameter. If 0 is passed, the requested operation is not retried automatically. If numRetries is non-zero and an error occurs such that no response is received from the pipe server (e.g., unable to open the pipe because the pipe server is not running), then the access functions sleep one second and automatically retry the same request up to the number of times indicated by numRetries. If the request still fails after performing numRetries retries, the access functions return an error.

Each of these functions also has a serverComputerName parameter. This parameter is the name of the computer (as returned by WIN32 GetComputerName function) on which the Pipe Server is running. In an MSCS environment, this is the Network Name value of the MSCS Virtual Server on which the Pipe Server is running. Unless otherwise specified, this parameter must be specified and cannot be NULL.

The following access functions are used for the PIPE_REQ_MIB, PIPE_REQ_ADM_ONLINE, and PIPE_REQ_ADM_OFFLINE message types described above. Unless otherwise specified, each of the functions return the integer 0 on success or −1 if an error occurred.

getFromMib( )

Purpose:

To retrieve one or more attribute values for a given object class from a Tuxedo MIB.

Function Call:

```
int getFromMib(
    LPINTR IntrPtr,
    DWORD numRetries,
    LPCSTR serverComputerName,
    LPCSTR className,
    FLDID32 keyAttr,
    LPCVOID keyValue,
    . . .
);
```

Parameters:

serverComputerName—This may be NULL, in which case the request is not submitted to the Pipe Server; instead the request is run in the current process.

className—A string used to identify the MIB class name.

keyAttr—A FLDID32 value representing the attribute to use as the "GET key". Set this to BADFLDID if there is no "GET key" (as is the case when the class is T_DOMAIN).

keyValue—A void pointer to the "GET key" value; this value is ignored if keyAttr is BADFLDID.

getAttr1=>A FLDID32 value representing an attribute to retrieve.

getvalue1=>A void pointer to a buffer large enough to hold the attribute value retrieved.

There are a variable number of additional getAttrN and getValueN parameters. The last getAttrN is denoted by a value of BADFLDID.

setInMib( )

Purpose:

To set one or more attribute values for a given object class in a Tuxedo MIB.

Function Call:

```
int setInMib(
    LPINTR IntrPtr,
    DWORD numRetries,
    LPCSTR serverComputerName,
    long flags,
    LPCSTR className,
    FLDID32 keyAttr,
    LPCVOID keyValue,
    ...
);
```

Parameters:

serverComputerName—This may be NULL, in which case the request is not submitted to the Pipe Server; instead the request is run in the current process.

className—A string used to identify the MIB class name.

flags—The TA_FLAGS values to use.

keyAttr—A FLDID32 value representing the attribute to use as the "SET key". Set this to BADFLDID if there is no "SET key" (as is the case when the class is T_DOMAIN).

keyValue—A void pointer to the "SET key" value; this value is ignored if keyAttr is BADFLDID.

setAttr1 =>A FLDID32 value representing an attribute to set.

setValue1 =>A void pointer to the attribute value to set. There are a variable number of additional setAttrN and setValueN parameters. The last setAttrN is denoted by a value of BADFLDID.

processSimpleRequestViaPipe( )

Purpose:

To build a PIPEREQ structure and send it to the server computer identified for processing. This function is used in the present embodiment for PIPE_REQ_ADM_ONLINE and PIPE_REQ_ADM_OFFLINE requests.

Function Call:

```
int processSimpleRequestViaPipe(
    LPINTR IntrPtr,
    DWORD numRetries,
    LPCSTR serverComputerName,
    DWORD requestCode,
    LPCSTR groupName,
    BOOL logPipeNotFound,
    BOOL logBrokenPipe
);
```

Parameters:

requestCode—the request code for the PIPEREQ structure.

groupName—a groupName value for request types that are not part of the present invention. This field is NULL for the PIPE_REQ_ADM_ONLINE and PIPE_REQ_ADM_OFFLINE request types.

logPipeNotFound—a flag which is TRUE if pipe not found errors (ERROR_FILE_NOT_FOUND) should be logged.

logBrokenPipe—a flag which is TRUE if broken pipe errors (ERROR_BROKEN_PIPE) should be logged.

Output:

This function returns one of the following values:

| | |
|---|---|
| PIPE_REP_GOOD_STATUS | - Success. |
| PIPE_REP_ERROR_STATUS | - General error. |
| PIPE_REP_MASTER_UNAVAILABLE | - Tuxedo Master was unavailable, so unable to accurately determine status. This status code is used with features that are not part of the present invention. |
| PIPE_REP_NO_RESPONSE | - No reply was received due to a broken pipe, timeout, etc. |

3. Pipe Server Architecture

The Pipe Server is implemented as a WIN32 console application. At startup, the following are passed as command line parameters:

TUXCONFIG Path—the full pathname of the TUXCONFIG file which corresponds to the Tuxedo Logical Machine to be serviced. This parameter is required.

Trace Level—the level of trace to activate for the server (0 for off, or 1 through 4 for increasing levels of trace detail). This parameter is optional; if omitted, tracing is turned off.

Number of Pipe Instances—the number of pipe instances that will be created. This parameter is optional; if omitted, the default value is 10. The maximum value for this parameter is 63. Creation of named pipes is discussed below in greater detail.

Worker Thread Inactivity Timeout—the amount of time (in milliseconds) that must elapse without any service requests to a particular worker thread before that worker thread terminates. This parameter is optional; if omitted, the default value is 60000 (i.e., one minute). The use of work threads is described below in greater detail.

A Pipe Server 42 can create multiple instances of a named pipe. Instances are distinct copies of the named pipe with the same name. Each instance can be used concurrently to maintain connections with different clients.

The main thread of the Pipe Server 42 creates a fixed number of pipe instances as specified by the Number of Pipe Instances parameters. The main thread multiplexes connection operations on the pipe instances by using overlapped I/O operations. With overlapped I/O, the connection operation is initiated with a call to the WIN32 ConnectNamedPipe function. If the operation does not complete immediately, the ConnectNamedPipe function returns a status of ERROR_IO_PENDING; when the connection completes, an event in an overlapped structure is signaled.

Each pipe instance is represented by the following C language structure:

```
typedef struct {
    OVERLAPPED          connectOverlap;
    HANDLE              hPipeInst;
    CLUS_WORKER         worker;
    HANDLE              workerActivateEvent;
    BOOL volatile       workerActive;
    CRITICAL_SECTION    workerCriticalSection;
    DWORD               dwState;
    #define CONNECTION_PENDING_STATE   0
    #define PROCESSING_STATE           1
    #define RECONNECTING_STATE         2
} PIPEINST, *LPPIPEINST;
```

OVERLAPPED, HANDLE, BOOL, CRITICAL_SECTION, and DWORD are data types defined by Win32.

CLUS_WORKER is a data type defined by MSCS. The fields of the PIPEINST structure are defined as follows:

connectOverlap—the overlapped structure required to perform overlapped connections. This structure contains an event handle that is used to indicate when an overlapped connection completes or a worker thread completes a service request.

hPipeInst—the handle for this pipe instance.

worker—a worker structure used by the set of MSCS Cluster Utility functions to control the worker thread.

workerActivateEvent—the event used to notify the worker thread when there is a service request to process.

workerActive—a flag that indicates if the worker thread is currently running.

workerCriticalsection—the Critical Section used to coordinate starting and terminating a worker thread. Critical Section is an object defined by Microsoft Windows NT.

dwState—the current state of the pipe instance. CONNECTION_PENDING_STATE represents that a ConnectNamedPipe is in progress. PROCESSING_STATE represents that a connection has been established with a client and the Pipe Server 42 is ready to process a request in a worker thread. RECONNECTING_STATE means that the request has been processed by the worker thread and the Pipe Server 42 is ready to disconnect from the client and start a new connection with a new client.

The Pipe Server 42 uses multi-threading to process each separate request that is received via a named pipe that it creates. Each such thread is referred to herein as a worker thread. In greater detail, after a client connects to a named pipe instance in the main thread, the request is processed in a separate worker thread. This allows the main thread to immediately resume servicing other pipe instances. Service requests can take several seconds to complete. Therefore, performing service requests in the main thread is not practical.

Each pipe instance has a corresponding worker thread. However, to optimize system resources, a worker thread is not started until the first time that a request is processed for a particular pipe instance. This means that if there are ten pipe instances, and the concurrency level of service requests from clients never exceeds six, the worker threads for the last four pipe instances are never started.

Once a worker thread is started, it loops waiting for additional service requests. If no additional service requests occur for the particular pipe instance within the timeout period defined by the parameter Worker Thread Inactivity Timeout, the worker thread terminates. The worker thread is automatically restarted when needed.

4. Main Thread and Worker Thread Processing

The main thread of the Pipe Server 42 performs the processing shown in Listing 2:

1) Initialize serverActive flag to TRUE. (This flag is set to False when a request to stop the Pipe Server 42 is made)
2) Process Pipe Server 42 command line parameters.
3) Allocate an array of PIPEINST structures (called Pipe) to represent the pipe instances.
4) Allocate an array of handles (called hEvents). The number of entries in the array is one greater than the number of pipe instances.
5) Create an event used to control termination of the Pipe Server 42. This event handle is stored in the last position of the hEvents array. This event is signalled when a request to stop the Pipe Server 42 is made.
6) For each pipe instance:
   a) Create an event for the connectoverlap structure (and store a copy of handle in hEvents).
   b) Create an event for worker activation.
   c) Initialize critical section used for worker activation.
   d) Create the pipe instance.
   e) Call WIN32 function ConnectNamedPipe to start listening for connections from clients.
   f) If ConnectNamedPipe returned ERROR_IO_PENDING:
      i) Change state to CONNECTION_PENDING_STATE.
   g) Else if ConnectNamedPipe returned ERROR_PIPE_CONNECTED:
      i) Change state to PROCESSING_STATE.
7) Loop while serverActive flag is TRUE:
   a) Call WIN32 function WaitForMultipleObjects waiting on the handles in the hEvents array. This waits for some work to do.
   b) If the event signaled is the last event in hEvents, then the Pipe Server 42 terminates. Otherwise, the particular event signaled corresponds to a particular pipe instance.
   c) If CONNECTION_PENDING_STATE:
      i) Call WIN32 function GetOverlappedResult to get the results of a completed overlapped ConnectNamedPipe operation.
      ii) Change to PROCESSING_STATE.
   d) If PROCESSING_STATE:
      i) Call WIN32 function ResetEvent for the event in the connectoverlap structure. The worker thread will signal this event when it has completed processing of the service request.
      ii) Call ActivateWorkerThread (described below) for this pipe instance.
      iii) Change to RECONNECTING_STATE.
   e) Else If RECONNECTING_STATE:
      i) Call WIN32 function DisconnectNamedPipe.
      ii) Call WIN32 function ConnectNamedPipe to start listening for connections from clients.
      iii) If ConnectNamedPipe returned ERROR_IO_PENDING:
         (1) Change state to CONNECTION_PENDING_STATE.
      iv) Else if ConnectNamedPipe returned ERROR_PIPE_CONNECTED:
         (1) Change state to PROCESSING_STATE.

Listing 2.

The ActivateWorkerThread function starts a worker thread if it is not already running, or activates the existing worker thread. The input parameter is a pointer to the PIPEINST structure. The function performs the steps shown in Listing 3.

1) Call WIN32 function EnterCriticalSection for workerCriticalSection.
2) If workerActive flag is TRUE:
   a) Signal the workerActivateEvent.
   b) Call WIN32 function LeaveCriticalSection for workerCriticalSection.
3) Else:
   a) Call LeaveCriticalSection for workerCriticalSection.
   b) Call the Cluster Utility Function ClusWorkerTerminate to insure that any previous worker thread is completely terminated.
   c) Call the Cluster Utility Function ClusWorkerCreate to create a worker thread running function WorkerThreadFunction (described below).

d) Set workerActive flag to TRUE.
e) Signal the workerActiveEvent.

Listing 3.

A TerminateWorkerThread function is called during server shutdown to force the termination of a worker thread. The input parameter is a pointer to the PIPEINST structure. The function performs the steps shown in listing 4, assuming that the serverActive flag has already been set to FALSE.

1) Signal the workerActivateEvent to make sure that the worker thread is not waiting.
2) Call the Cluster Utility Function ClusWorkerTerminate.

Listing 4.

The WorkerThreadFunction is invoked in a new worker thread when the Cluster Utility Function ClusWorkerCreate is called. The WorkerThreadFunction function performs the steps shown in Listing 5.

Loop while serverActive flag is TRUE:
1) Call WIN32 function WaitForSingleObject waiting on workerActivateEvent. The length of the timeout is the value given by the server parameter Worker Thread Inactivity Timeout.
2) If waitForSingleObject timed out:
   a) Call EnterCriticalSection for workerCriticalSection.
   b) Call WaitForSingleObject again waiting on workerActivateEvent. The length of the timeout is 0 to cause an immediate return.
   c) If WaitForSingleObject timed out again:
      i) Set workerActive flag to FALSE.
      ii) Call LeaveCriticalSection for workerCriticalSection.
      iii) Free FML32 buffers allocated for request and reply.
      iv) Return from WorkerThreadFunction, which ends the worker thread.
   d) Call LeaveCriticalSection for workerCriticalSection.
3) If serverActive flag is FALSE:
   a) Return from WorkerThreadFunction, which ends the worker thread.
4) Read the request from the named pipe instance into a temporary buffer.
5) If the request code is PIPE_REQ_MIB:
   a) If not already allocated, allocate FML32 buffers for request and reply.
   b) Copy the temporary buffer (starting at the second word) into the request FML32 buffer.
   c) Process the MIB request (described below in greater detail).
   d) Write the reply FML32 buffer to the named pipe instance.
   e) Clear the FML32 request and reply buffers for reuse.
6) Else
   a) cast the temporary buffer as a PIPEREQ structure.
   b) Process the request according to the requestCode field (more detailed description below).
   c) Write the PIPEREP structure to the named pipe instance.
7) Read from the named pipe instance solely to wait for the client to complete processing and close the client end of the pipe. When the client closes the pipe, this read will receive an ERROR_BROKEN_PIPE error.
8) Signal the event in the connectoverlap structure to indicate that processing is completed.

Listing 5.

5. Error Logging

All error logs are written to the Tuxedo ULOG. The following conditions are logged: (a) any unexpected error returned from a WIN32 API function; (b) any unexpected error returned from a Cluster API function; and (c) any unexpected error returned from a Tuxedo Admin API function.

6. Detailed Operation

Figure 5A:
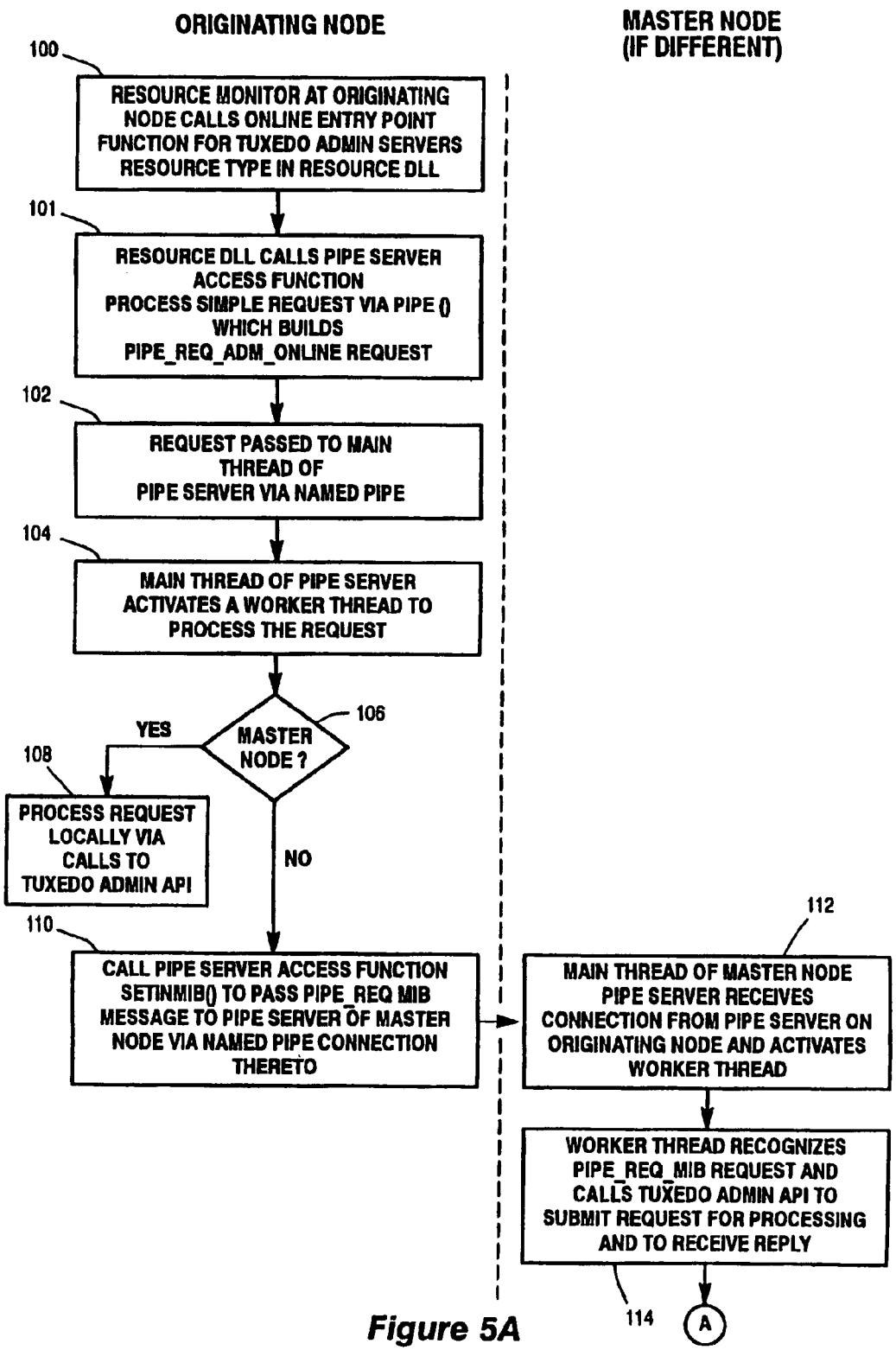
FIGS. 5A and 5B comprise a flow diagram illustrating further details of the operation of the present invention in the exemplary environment of FIG. 4.
Figure 5B:
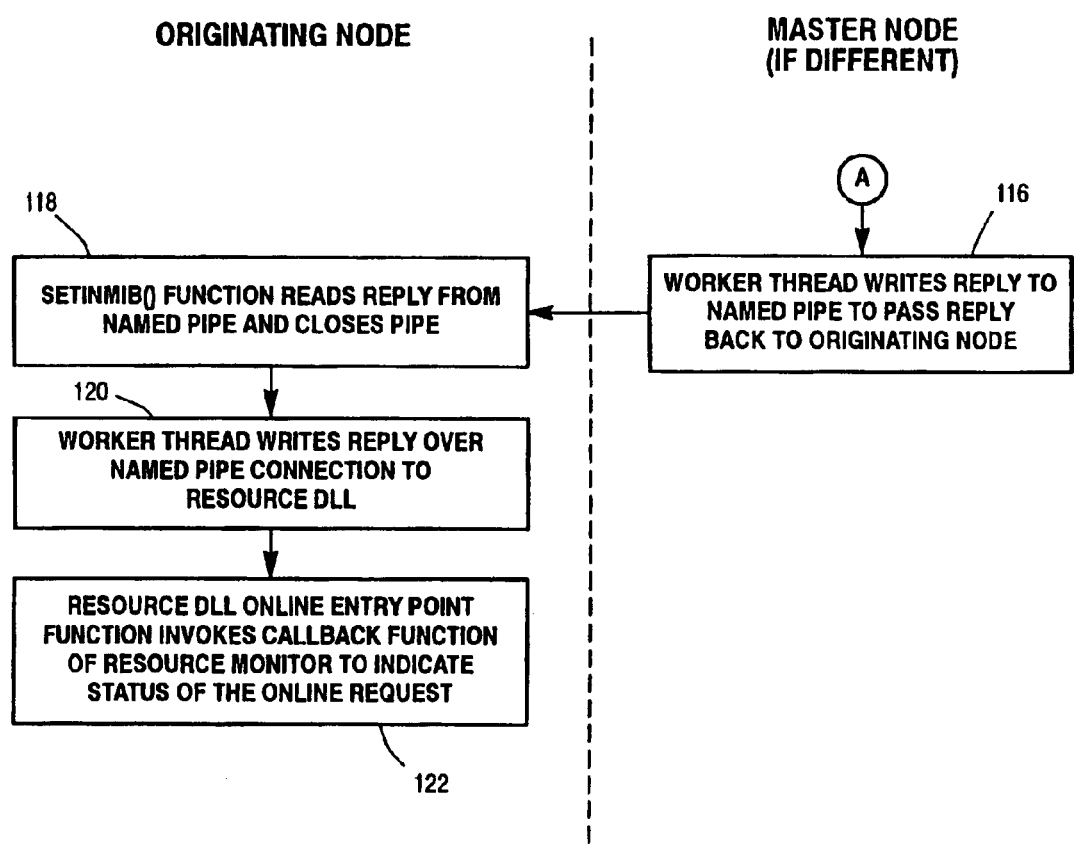

FIGS. 5A–5B comprise a flow diagram providing a more detailed illustration of the operation of the present invention in the exemplary application illustrated in FIG. 4. In particular, FIGS. 5A–5B illustrate the handling of an ONLINE request.

At step 100, the Resource Monitor 26 calls the ONLINE entry point function for the Tuxedo Admin Servers Resource Type in the Resource DLL 40. The ONLINE entry point function starts a new thread to process the request and returns ERROR_IO_PENDING status to the Resource Monitor 26.

Next, at step 101, the Resource DLL 40 calls the processSimpleRequestViaPipe( ) function passing it the PIPE_REQ_ADM_ONLINE request code. The processSimpleRequestViaPipe( ) function constructs the appropriate request message (i.e. builds a PIPEREQ structure with a request code of PIPE_REQ_ADM_ONLINE) and constructs the correct name of the named pipe for the Pipe Server 42 on this node (i.e., the originating node). At step 102, the Resource DLL 40 then performs the initial message exchange steps shown in Listing 1 above.

At step 104, the main thread of the Pipe Server 42 receives the connection from the Resource DLL 40 and activates a worker thread to process the request. The worker thread recognizes the PIPE_REQ_ADM_ONLINE request code and begins processing the request. At step 106, the worker thread determines whether the current node (i.e., the originating node) is the designated master for the Tuxedo application. Specifically, the worker thread calls a getMasterIds( ) function (not shown) that obtains the TA_MASTER attribute from the T_DOMAIN object of the Tuxedo application. The TA_MASTER attribute specifies the Logical Machine ID (LMID) of the currently designated master for the Tuxedo application. Using the LMID of the master, the Physical Machine ID (PMID) of the master can be obtained from the TA_PMID attribute of the Tuxedo T_MACHINE object. The worker thread then calls a getLmid( ) function (not shown) that calls the Win32 function GetComputerName to determine the Physical Machine ID (PMID) of the originating node. It then obtains the TA_LMID attribute from the Tuxedo T_MACHINE object corresponding to the PMID. Because the request is an ONLINE request in this example, the worker thread also verifies from the TA_STATE attribute of the T_MACHINE object that the current state is INACTIVE.

If at step 106, it is determined from the LMIDs and PMIDs that the originating node is the master node, then the PIPE_REQ_ADM_ONLINE request is processed locally at step 108. In such a case, the worker thread will first determine whether a backup master node has been designated. If so, the Pipe Server sends a request to the Pipe Server on the backup master, asking the backup master to redesignate itself as the master. If this is successful, the worker thread then transfers the Online request via the named pipe connection to the Pipe Server on the new master so that it can process the request in order to bring the originating node (which, for example, may be trying to restart after a failure) back on-line. If there is no backup master, then the Pipe Server on the originating node calls the Tuxedo Admin API directly to bring the Tuxedo Domain online on that node.

If at step 106, it is determined that the originating node is not the master node, then control passes to step 110. At step 10, the worker thread calls the Pipe Server access function setInMIB( ) to create a PIPE_REQ_MIB message in which the FML32 buffer contains a request to set the TA_STATE attribute in the T_MACHINE object associated with the LMID of the originating node to ACTIVE (this is the way in which an ONLINE request is made via the Tuxedo Admin API). The setInMIB( ) function then constructs the correct name of the named pipe for the Pipe Server on the master node and performs the initial message exchange steps (see Listing 1 above) to transfer the message to the Pipe Server on the master node.

At step 1112, the main thread of the Pipe Server 42 on the master node receives the connection from the Pipe Server 42 on the originating node and activates its own worker thread to process the PIPE_REQ_MIB request. At step 114, the worker thread recognizes the PIPE_REQ_MIB request and makes appropriate calls to the Tuxedo Admin API to have the request processed and to receive a reply. Specifically, in this example, the worker thread calls the Tuxedo Admin API function tpinit( ) to connect to the Tuxedo application, and then calls the Tuxedo Admin API function tpacall( ) followed by tpgetreply( ) to submit the request for processing and to receive a reply, respectively.

Next at step 116, the reply FML32 buffer (indicating success or failure) is passed back to the originating node via the same named pipe connection. At step 118, the setInMIB( ) function on the originating node reads the reply from the named pipe and closes the pipe. At step 120, the worker thread on the originating node then writes the reply PIPEREP message over the named pipe connection to the Resource DLL 40 on the originating node. Finally, at step 122, the ONLINE entry point function of the Resource DLL 40 invokes the appropriate callback function of the Resource Monitor 26 to indicate the status of the ONLINE request. Processing of other administrative requests that must be performed by the designated master node for a Tuxedo application, such as an OFFLINE request, is similar to the above.

"Microsoft," "Windows," and "Windows NT" are registered trademarks of Microsoft Corporation. "BEA" and "TUXEDO" are registered trademarks of BEA Systems, Inc. "Oracle" is a registered trademark of the Oracle Corporation.

As the foregoing illustrates, the present invention is directed to a method for enabling a distributed network application that requires centralized administration via a master node to be deployed in a clustered environment that does not support such centralized administration, so that the application can take advantage of the increased availability achieved through clustering. It is understood that changes may be made to the embodiments described above without departing from the broad inventive concepts thereof. For example, while the preferred form of connection between Pipe Servers is a Windows NT named pipe, other forms of inter-process communication can be employed. Additionally, as mentioned above, while a particular embodiment is described wherein the invention is employed to enable a Tuxedo-based application to run in an MSCS-controlled computer cluster, the present invention is not limited to use with Tuxedo-based applications and/or MSCS-controlled computer clusters, but rather may be employed in any system in which a distributed network application requires centralized administration via a master node, but wherein the clustered environment in which the application is deployed does not support such centralized administration. Accordingly, the present invention is not limited to the particular embodiments disclosed, but is intended to cover all modifications that are within the spirit and scope of the invention as defined by the appended claims.

What is claimed is:

1. In a clustered computing environment of a type comprising a plurality of nodes wherein each node implements its own administrative operations, a method for enabling a distributed network application that requires centralized administration via a defined master node to execute on each of the nodes of the duster, said method comprising:
   receiving an administrative request from the clustered computing environment at an originating node thereof;
   determining for each received administrative request whether the originating node is a designated master node for the distributed network application; and
   routing the administrative request from the originating node to the designated master node if the originating node is not the designated master node.

2. The method recited in claim 1, wherein said routing step comprises:
   creating an instance of a named pipe that provides a connection between the originating node and the master node; and,
   passing the administrative request from the originating node to the master node via the named pipe.

3. The method recited in claim 2, further comprising the step of sending a reply to the administrative request from the master node back to the originating node via the named pipe.

4. The method of claim 2, further comprising the steps of:
   receiving the administrative request at the master node via the named pipe; and calling an administrative application programming interface (API) of the distributed network application to initiate processing of the request by the designated master node.

5. A server program embodied on a computer-readable medium for use in a clustered computing environment of a type comprising a plurality of nodes wherein each node implements its own administrative operations, the server program comprising program code for enabling a distributed network application that requires centralized administration via a defined master node to execute on each of the nodes of the cluster, the program code of said server program, when executed on each node of the cluster, causing any of said nodes to perform the following steps:
   receiving an administrative request from the clustered computing environment at that node, that node defining an originating node;
   determining for each received administrative request whether the originating node is a designated master node for the distributed network application; and
   routing the administrative request from the originating node to the designated master node if the originating node is not the designated master node.

6. The server program recited in claim 5, wherein the program code causes the node to perform said routing step by creating an instance of a named pipe that provides a connection between the originating node and the master node, and, passing the administrative request from the originating node to the master node via the named pipe.

7. The server program recited in claim 6, wherein the program code causes the master node to send a reply to the administrative request from the master node back to the originating node via the named pipe.

8. In a clustered computing environment comprising a plurality of nodes over which a distributed network application executes, wherein the clustered computing environment is of a type wherein each node implements its own administrative operations, and the distributed network application requires centralized administration via a designated master node, the improvement comprising: a server program executing on each node that intercepts administrative requests from the clustered computing environment at that node, determines for each intercepted administrative request whether the originating node is the designated master node for the distributed network application, and that routes the administrative request from the originating node to the designated master node if the originating node is not the designated master node.

9. The clustered computing environment recited in claim 8, wherein the server program routes the administrative requests to the designated master by creating an instance of a named pipe that provides a connection between the originating node and the master node, and then passing the administrative request from the originating node to the master node via the named pipe.

10. The clustered computing environment recited in claim 8, wherein the sever program further send a reply to the administrative request from the master node back to the originating node via the named pipe.

* * * * *